Oct. 6, 1942.  H. E. SLOAN ET AL  2,297,922
CHUCK OPERATING MECHANISM
Filed June 24, 1940
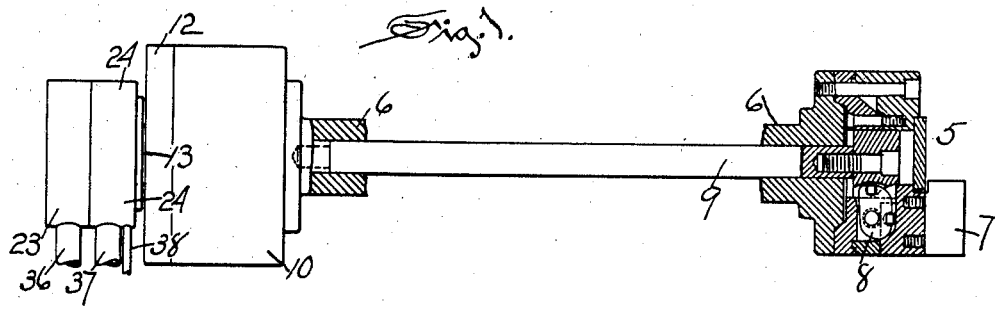
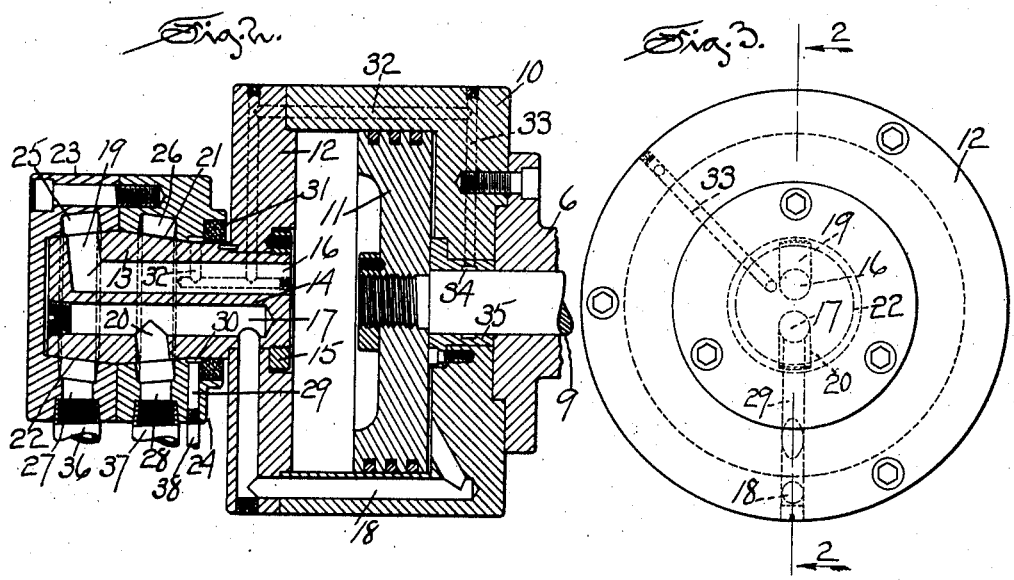
INVENTORS
Harry E. Sloan
Harry E. Sloan, Jr.
George A. Högberg
by Arthur B. Jenkins
ATTORNEY Patented Oct. 6, 1942

2,297,922

UNITED STATES PATENT OFFICE 2,297,922

CHUCK OPERATING MECHANISM

Harry E. Sloan and Harry E. Sloan, Jr., Hartford and George A. Highberg, West Hartford, Conn., assignors to The Cushman Chuck Company, Hartford, Conn., a corporation of Connecticut Application June 24, 1940, Serial No. 342,080

11 Claims. (Cl. 121—38)

This invention relates to the class of devices for actuating the chuck jaws of machine operating chucks, and an object of the invention, among others, is the production of a structure whereby the effectiveness of the mechanism in operation is increased.

One form of a machine embodying the invention and in the construction and use of which the objects herein set out, as well as others may be attained is illustrated in the accompanying drawing, in which—

Figure 1 is a side view of a chuck operating structure illustrating a chuck and the means for operating the chuck actuating draw bar, the chuck spindle being shown as broken away intermediate its ends.

Figure 2 is a view on enlarged scale in axial section through the draw bar operating mechanism embodying the invention on plane of broken line 2—2 of Fig. 3.

Figure 3 is an end view of the same looking at the left hand end as seen in Fig. 2.

In the accompanying drawing the numeral 5 denotes a chuck supported on one end of a rotating spindle 6, the chuck being of any common construction embodying jaws 7 engaged with rockers 8 that are operated as by means of a draw bar 9. The construction of the mechanism at this end of the draw bar and its connection with the chuck jaws may be embodied in any of the well known mechanisms employed in different chucks of this character and which are well known to those skilled in the art and a full and more complete description and illustration are therefore omitted herein.

That end of the draw bar 9 opposite the chuck extends into a cylinder 10, and a draw bar operating piston 11 is secured to this end of the draw bar within the cylinder 10 in any suitable manner, screw threaded engaging parts being shown herein for the purpose. The cylinder is secured to the spindle 6 to rotate therewith and one end is closed by a head 12 secured thereto as by means of screw bolts, or any other suitable devices.

A ported hub 13 is secured to the head 12 as by means of a neck 14 extending into an opening in the head and engaged therein by a nut 15 that secures the hub in place. This hub has passages 16—17, the former opening into the cylinder at one side of the piston 11 and the other opening through a passage 18 extending through the head 12 and wall of the cylinder into the chamber in the latter on the opposite side of the piston, as shown in Fig. 2 of the drawing. The hub 13 has a sealing surface sloping in opposite directions intermediate its ends, the passages 16—17 each opening through one of the ports 19 or 20 on one of said sloping surfaces. In the form shown herein the hub is bulged intermediate its ends creating sloping sealing surfaces 21—22, as shown in Fig. 2.

A pressure chest is mounted on the hub 13, this chest comprising two sections 23—24 joined on the plane of the greatest diameter of said hub, as by means of screws. This chest has two annular passages 25—26 in the sections 23—24, respectively, which passages communicate, respectively, with the passages 17—16 in the hub 13. The pressure chest is secured against rotation to the frame of the machine upon which the spindle is mounted, the hub 13 however rotating freely within the chest.

Inlet and exhaust ports 27—28 open through the sections 23—24 of the pressure chest, the mouths of these ports being shown as threaded so that inlet and exhaust tubes 36 and 37 may be connected therewith, such tubes being connected with a source of pressure to be used in the cylinder for moving the piston 11 in opposite directions. It will be understood that the pressure is admitted alternately to the ports 27—28, when pressure is admitted to one port the exhaust being through the other port. This pressure when admitted to either port will act upon the sealing surfaces 21—22 hereinbefore referred to in such manner as to seal the joint between the annular passages 25—26 so that pressure will not pass between the passages from the one to which it is being supplied. The sections 23—24 being rigidly secured together if pressure is admitted to the port 28 this pressure acting upon the sloping surface 21 and transmitting a force against such surface will tend to move the chest as a whole toward the right, thereby pressing the sloping surface of the section 23 of the chest against the sloping surface 22, thereby creating a seal between the annular passages 25—26. When pressure is admitted to the passage 25 a reverse action will take place.

An oil duct 29 threaded to receive a tube 38 leads to an annular groove 30 in the pressure chest and a duct 32 in the hub 13 communicates deviously with another similarly extending duct in the cylinder head and cylinder wall and leading into a duct 33, the latter duct leading to an annular channel 34 in a sleeve 35 surrounding the draw bar within the piston end, said channels and ducts being for the purpose of exhausting to a suitable tank through the tube 38 any excess overflow of oil in the structure. The inlet and exhaust tubes 36 and 37 lead into the inlet and exhaust ports 27—28, respectively as hereinbefore mentioned, and a packing or oil sealer 31 is secured in a recess in the section 24 of the chest, as shown in Fig. 2.

In accordance with the provisions of the patent statutes we have described the principles of operation of our invention, together with the device which we now consider to represent the best embodiment thereof; but we desire to have it understood that the device shown is only illustrative and that the invention may be carried out by other means and applied to uses other than those above set out.

We claim:

1. In a fluid operated device the combination of a cylinder with a piston therein and operating means extending from said piston, a hub projecting from the end of the cylinder, said hub and cylinder having passages to supply pressure to the piston on opposite sides thereof, sloping sealing surfaces formed on said hub, a pressure chest mounted on said hub and having sealing surfaces conforming in shape to those on said hub and also having supply and exhaust ports opening against said sealing surfaces and communicating with said passages, whereby pressure created by resistance of the piston to movement will be extended to said sealing surfaces to pack the joint between said supply and exhaust ports.

2. In a fluid operated device the combination of a cylinder with a piston therein and operating means extending from said piston, a hub projecting from the end of the cylinder, said hub and cylinder having passages to supply pressure to the piston on opposite sides thereof, sealing surfaces formed on said hub and sloping in opposite directions one from the other, and a pressure chest mounted on said hub and having sealing surfaces conforming in shape to those on said hub and also having supply and exhaust ports opening against said sealing surfaces and communicating with said passages, whereby pressure created by resistance of said piston to movement will be extended to said sealing surfaces to pack the joint between said supply and exhaust ports.

3. In a fluid operated device the combination of a cylinder with a piston therein and operating means extending from said piston, a hub projecting from the end of the cylinder, said hub having a bulge intermediate its ends forming sealing surfaces sloping in opposite directions one from the other, and a pressure chest mounted on said member and having sealing surfaces conforming in shape to those on said hub and also having supply and exhaust ports opening against said sealing surfaces and communicating with said passages, whereby pressure created by resistance of said piston to movement will be extended to said sealing surfaces to pack the joint between said supply and exhaust ports.

4. In a fluid operated device the combination of a cylinder with a piston therein and operating means extending from said piston, a hub projecting from the end of the cylinder, said cylinder and hub having passages to supply pressure to the piston on opposite sides thereof, sealing surfaces formed on said hub and sloping in opposite directions one from the other, and a pressure chest mounted on said hub and having sloping surfaces conforming in shape to those on said hub, said chest being formed in sections divided on a plane intersecting the angle formed by said sloping surfaces, with supply and exhaust ports opening against said sealing surfaces and communicating with said passages whereby pressure created by resistance of said piston to movement will be extended to said sealing surfaces to pack the joint between said supply and exhaust ports.

5. In a fluid operated device the combination of a cylinder with a piston therein and operating means extending from said piston, a hub projecting from the end of the cylinder said hub having a bulge intermediate its ends forming sealing surfaces sloping in opposite directions one from the other, a pressure chest mounted on said hub and having sealing surfaces conforming in shape to those on said hub said chest being formed in sections divided on a plane intersecting the angle formed by said sloping surfaces, with supply and exhaust ports opening against the sealing surfaces and communicating with said passages, and means for extending pressure from said ports to opposite sides of said piston, whereby pressure created by resistance of said piston to movement will be extended to said sealing surfaces to pack the joint between said supply and exhaust ports.

6. In a fluid operated device the combination of a cylinder with a piston therein and operating means extending from said piston, a hub projecting from the end of the cylinder, said hub and cylinder having two sets of passages, each set to supply pressure to the piston on the side thereof opposite to that to which the other set supplies pressure, sloping sealing surfaces formed on said hub, a pressure chest mounted on said hub and having sealing surfaces conforming in shape to those on said hub and also having supply and exhaust passages each communicating with one of said sets of passages in said hub, and an annular supply and exhaust groove opening against each of said sloping surfaces, whereby pressure created by resistance of said piston to movement will be extended to said sealing surfaces to pack the joint between said supply and exhaust ports.

7. In a fluid operated device the combination of a cylinder with a piston therein and operating means extending from said piston, a hub projecting from the end of the cylinder and having sealing surfaces projecting in opposite directions, said hub also having two sets of passages each set to supply pressure to and to conduct exhaust from the piston on the side thereof opposite to that upon which the other set acts, and a pressure chest mounted on said hub and having cooperating sealing surfaces conforming in shape to those on said hub, said chest comprising two parts each of which has an annular supply and exhaust groove each communicating with one of said sets of said passages in said hub, whereby pressure created by resistance of said piston to movement will be extended to said sealing surfaces to pack the joint between said supply and exhaust ports.

8. In a fluid operated device the combination of a cylinder with a piston therein and operating means extending from said piston, a hub projecting from the end of the cylinder, said hub and cylinder having two sets of passages, each set to supply pressure to the piston on the side thereof opposite to that upon which the other set acts, sloping sealing surfaces formed on said hub, a pressure chest mounted on said hub and having sealing surfaces conforming in shape to those on said hub, whereby pressure created by resistance of said piston to movement will be extended to said sealing surfaces to pack the joint between said supply and exhaust ports, an annular oil groove in the opening through said hub, and oil ducts leading from said annular groove in the chest through the hub and cylinder and into an annular groove surrounding the draw bar within the opening of the latter into the cylinder.

9. The combination with a rotating member having passages to receive fluid under pressure with sloping sealing surfaces formed to independently receive pressure supplied to said member, of a pressure chest mounted on said member and having sealing surfaces conforming in shape to those on said member and also having ports each operating both as a supply and as an exhaust port and each opening against one of said sealing surfaces and communicating with said passages.

10. The combination with a rotating member having passages to receive fluid under pressure with sealing surfaces formed to independently receive pressure supplied to said member and sloping in opposite directions one from the other, of a pressure chest mounted on said member and having sealing surfaces conforming in shape to those on said member and also having ports each operating both as a supply and as an exhaust port and each opening against one of said sealing surfaces and communicating with said passages.

11. The combination with a rotating member having passages to receive fluid under pressure, said member having a bulge intermediate its ends forming sealing surfaces sloping in opposite directions one from the other to independently receive pressure, of a pressure chest mounted on said member and having sealing surfaces conforming in shape to those on said member and also having ports each operating both as a supply and as an exhaust port and each opening against one of said sealing surfaces and communicating with said passages.

HARRY E. SLOAN.
HARRY E. SLOAN, Jr.
GEORGE A. HIGHBERG.